US011265999B2

United States Patent
Betz

(10) Patent No.: US 11,265,999 B2
(45) Date of Patent: Mar. 1, 2022

(54) CONTROL OF LIGHTING SYSTEMS

(71) Applicant: DAIMLER AG, Stuttgart (DE)

(72) Inventor: Daniel Betz, Rottenburg-Seebronn (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/962,292

(22) PCT Filed: Jan. 8, 2019

(86) PCT No.: PCT/EP2019/050305
§ 371 (c)(1),
(2) Date: Jul. 15, 2020

(87) PCT Pub. No.: WO2019/141535
PCT Pub. Date: Jul. 25, 2019

(65) Prior Publication Data
US 2020/0375012 A1 Nov. 26, 2020

(30) Foreign Application Priority Data
Jan. 17, 2018 (DE) ..................... 10 2018 000 318.4

(51) Int. Cl.
*B60Q 3/80* (2017.01)
*H05B 47/19* (2020.01)
*B60Q 3/16* (2017.01)
*H05B 47/165* (2020.01)

(52) U.S. Cl.
CPC .............. *H05B 47/19* (2020.01); *B60Q 3/16* (2017.02); *B60Q 3/80* (2017.02); *H05B 47/165* (2020.01)

(58) Field of Classification Search
CPC ........ H05B 47/19; H05B 47/165; B60Q 3/16; B60Q 3/80
See application file for complete search history.

(56) References Cited

U.S. PATENT DOCUMENTS

| 9,672,675 | B1 | 6/2017 | Nishiyama et al. |
| 9,774,474 | B2 * | 9/2017 | Langer .................... H04L 67/12 |
| 2014/0309790 | A1 * | 10/2014 | Ricci ....................... B60R 25/20 700/276 |

(Continued)

FOREIGN PATENT DOCUMENTS

| CN | 102842321 A | 12/2012 |
| CN | 203301802 U | 11/2013 |
| CN | 106804084 A | 6/2017 |

(Continued)

OTHER PUBLICATIONS

Machine translation of KR20060104299A, including page numbers. (Year: 2006).*

(Continued)

*Primary Examiner* — Alexander H Taningco
*Assistant Examiner* — Pedro C Fernandez
(74) *Attorney, Agent, or Firm* — Patent Portfolio Builders PLLC

(57) ABSTRACT

A communication network for networking lighting systems of home and office technology involves an application on a mobile terminal that can control lighting systems in the surroundings of the mobile terminal. The lighting systems in the interior of a vehicle are also networked and the lighting systems are controlled depending on the lighting settings of a screen of the mobile terminal.

15 Claims, 1 Drawing Sheet

(56) References Cited

U.S. PATENT DOCUMENTS

Figure 1:
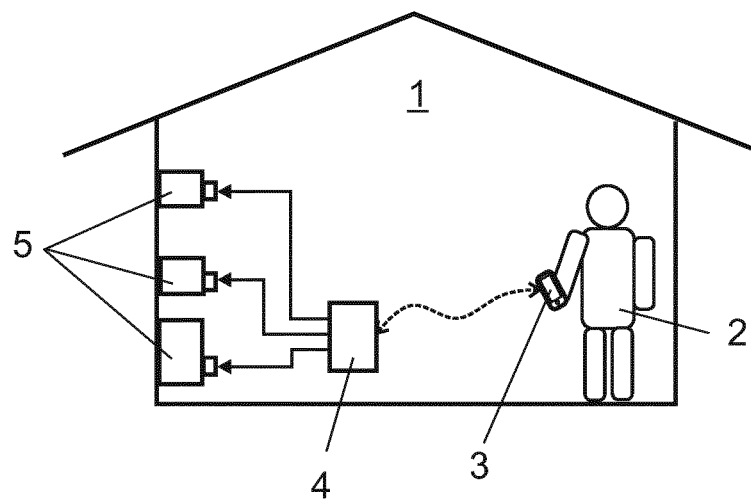

2018/0096668 A1* 4/2018 Surnilla .................... B60R 1/00
2019/0208388 A1* 7/2019 Oldewurtel ............ H04L 69/04

FOREIGN PATENT DOCUMENTS

| DE | 102011121480 A1 | 6/2013 |
| DE | 102014003949 A1 | 9/2015 |
| DE | 102015119630 A1 | 5/2017 |
| DE | 102016121307 A1 | 5/2017 |
| DE | 102016004032 A1 | 10/2017 |
| DE | 102016208634 A1 | 11/2017 |
| EP | 1535495 B1 | 1/2010 |
| EP | 3116167 A1 | 1/2017 |
| KR | 20060104299 A | 10/2006 |
| WO | 2016145064 A1 | 9/2016 |

OTHER PUBLICATIONS

Examination Report created on Oct. 9, 2018 in related/corresponding DE Application No. 10 2018 000 318.4.
International Search Report dated Mar. 8, 2019 in related/corresponding International Application No. PCT/EP2019/050305.
Written Opinion dated Mar. 8, 2019 in related/corresponding International Application No. PCT/EP2019/050305.
Office Action dated Jul. 1, 2021 in related/corresponding CN Application No. 201980008758.0.

* cited by examiner

CONTROL OF LIGHTING SYSTEMS

BACKGROUND AND SUMMARY OF THE INVENTION

Exemplary embodiments of the invention relate to a communication network for networking lighting systems and a method for controlling lighting systems. Furthermore, exemplary embodiments of the invention relate to an application for a mobile terminal for controlling lighting systems in such a communication network and/or by means of such a method.

EP 1 535 495 B1 describes a complex system for lighting surroundings and is explained using the example of an interior of a flight passenger cabin. Here, it is described that different lighting scenarios can be provided during the course of the flight, for example, wherein in particular the color of the light, and thus ultimately the color temperature of the white light and the light intensity, are controlled here.

EP 3 116 167 A1 describes a location-dependent control of comfort variables of a room via a mobile communication terminal such as a smartphone, for example. This terminal detects certain variables using its sensors and thus controls nearby actuators of the building control, such as temperatures and the illumination intensity. The control is designed in such a way that an application in the mobile terminal correspondingly networks with the home technology devices and controls them depending on an application on the mobile terminal.

It is generally known that different types of lighting, and here in particular the amount or intensity of light and thus the perceived brightness and the color temperature, have a strong influence on the sense of well-being. Here, the color temperature concerns fundamentally different colors, but substantially white light, which is either referred to as warm white, neutral white or cold white light depending on the color temperature.

From the general prior art, systems are known which automatically and/or individually control the color temperature and brightness of the general lighting (e.g. ceiling lights, standing lamps, desk lamps . . . ).

From the further general prior art, systems are also known to correspondingly adjust the background lighting of mobile terminals with a screen, for example smartphones or tablet computers, in particular to adapt the color temperature and light quantity, for example depending on the brightness of the environment or a user setting.

In practice, these settings only affect individual aspects of a person's life, which are perceived as pleasant for a short time, but in the long term are more likely to be perceived as stressful, because the settings constantly change depending on the location and activity, and because different individual settings cannot be taken into account here. This applies in particular to applications such as those in the above-mentioned document, in which a large number of people within an aircraft come into contact with the lighting without individual settings for each individual seat being able to be implemented with reasonable effort.

Exemplary embodiments of the present invention are therefore directed to a communication network for networking lighting systems and a method for controlling lighting systems, which enables an individually adaptable pleasant lighting scenario for the user.

The communication network according to the invention serves to network lighting systems of home and office technology with an application on a mobile terminal device with the aim of controlling the lighting systems in the environment of the mobile terminal via the application on the mobile terminal. According to the invention, lighting systems in the interior of a vehicle are also networked as part of the communication network. This results in the possibility of a holistic networking of lighting systems with which a user comes into contact during the course of the day. This can be, in particular in the area of home technology, the lighting in the user's home, in the area of office technology it can be the lighting systems at his/her workplace, and in the area of lighting systems in the interior of a vehicle it can be the ambient interior lighting and the lighting of display elements in his/her vehicle.

The lighting systems, which basically comprise lighting means and display elements, in particular their backlighting, can be controlled according to an advantageous further development of the invention at least with regard to the color temperature. Via the application on the mobile terminal, the user can thus ensure that whenever he/she is in the vicinity of the lighting systems connected via the communications network, these are controlled according to the settings carried out in the application. This results in a consistent lighting concept for the user of such a communication network, which accompanies him/her from getting up in the morning at home to driving to work in his/her own vehicle, at work, driving home in his/her own vehicle and in the evening at home.

The lighting concept can be adjusted according to his/her individual needs and or medical findings. By way of example, it has proven to be very advantageous if the user finds a cold white activating lighting in the morning, which remains like this in the vehicle and at the workplace until it changes to a warm white light color during the day, which is then available again at the workplace, when driving home in the vehicle and after arriving home. In this way, the user experiences a consistent lighting concept which is geared to the human needs and can be parameterized by him/her as desired.

Part of the communication network according to the invention can be, in a very favorable design of the same, a database that has stored all controllable elements of the lighting systems, as well as control parameters to implement the setting of the application. This database can be managed and made available as an online database, for example in a Cloud or via a backend server of the vehicle manufacturer. It can also be implemented as an offline database, which then enables the functionality without a continuous mobile radio connection, for example by storing the database as an offline database on the mobile terminal, such that the mobile terminal can control networked lighting systems in the house, at the workplace and in the vehicle which are located nearby, for example via short-range communication possibilities such as NFC, wireless network, Bluetooth or similar.

Due to the typically very intensive use of mobile terminals with a display screen nowadays, it is very common that lighting settings, for example during the course of the day, are already available as lighting settings for the display screen of the mobile terminal, as described above. The method according to the invention for controlling lighting systems via an application on the mobile terminal according to the invention requires that the mobile terminal or the application on the mobile terminal forms a communication network with lighting systems located in the vicinity, for example in the manner described above. The method according to the invention also provides that the lighting settings for the screen of the mobile terminal are transferred to the lighting systems which are controlled via the mobile terminal. This allows an extremely simple operation, as the user only has to select or adopt an appropriate lighting setting for the screen settings of his/her mobile terminal according to the suggestions of the manufacturer. This is then transferred to his/her entire networked environment with the lighting systems. This results in a simple and efficient lighting system adapted to the user, which is ideal in terms of the light quantity and the light color. In simple terms, high blue content and high brightness in the morning are important, while warmer colors and lower blue content are advantageous in the evening, in particular to support a healthy sleep rhythm. The right lighting concept, which is transferred to the user's entire environment through the communication network and the method according to the invention without the need for any significant programming, helps the user to keep his/her body in sync with the daily routine, thereby achieving increased attention, better concentration and a greater sense of well-being.

The method according to the invention can be designed according to an advantageous development in such a way that the lighting systems comprise lighting means and display elements, and here again in particular their background lighting, of house/home technology, office technology and an ambient interior lighting in a vehicle and/or the illumination of display elements, and here again in particular the background lighting of the same in a vehicle. The method according to the invention thus makes it possible to be present in all essential areas in which a person is active during the day in order to achieve the best possible adaptation of lighting acting on the person to his/her circadian rhythm.

As already mentioned, it can here be provided in accordance with an advantageous development that a time-dependent profile can be set on the mobile terminal for the lighting settings of its screen, which is then used directly or after a parameterization by the user to control the lighting systems. This enables a very simple and efficient use, which also offers the advantage that, due to the adapted surroundings lighting of the correspondingly adjusted screen of the mobile terminal, for example of a smartphone or a tablet, the screen is always correspondingly easy to read.

The communication network is preferably set up by an application for a mobile terminal and the method is carried out by means of such an application, which is designed to read current screen settings of a screen of the mobile terminal and to take these as a basis for controlling the lighting systems. The application can be an independent application or a sub-function of a higher-level basic application, in particular a vehicle-related basic application. Such a basic application could, for example, be an application or an app distributed by the vehicle manufacturer, which provides corresponding functionalities and information on the respective vehicle, which allows the possibility of programming vehicle settings comfortably on the mobile terminal, and which, supplemented by the functionality according to the invention, also controls the lighting system correspondingly not only in the vehicle itself but also in the area of home technology and office technology. Here, a clear example could be the app "mercedes-me" as a basic application.

In accordance with an advantageous development of the invention, the application can allow the lighting settings of the screen of the mobile terminal to be changed via adjustable parameters and/or determined by sensors of the mobile terminal, such as the ambient brightness or lighting situation, in order to control the lighting systems such that, for example, the lighting settings of the screen can be adapted to an environment that cannot be influenced, for example in a daylight situation, which then again has an influence on controlled lighting systems in the vicinity of the mobile terminal. As already mentioned, time-dependent profiles can be stored, which enable appropriate settings depending on the time of day. These profiles can be further adapted by using additional brightness- and/or location-dependent profiles within the application, for example, to automatically make changes to the lighting settings of the screen of the mobile terminal and to set parameters. This then has an effect on the lighting in the environment corresponding to the method according to the invention. Such brightness-dependent and/or location-dependent profiles can be used, for example, to adapt daytime-dependent profiles to the different daylight conditions in winter and summer and, if necessary, depending on the weather situation, such that the user does not have to constantly adjust the settings himself in order to be able to implement a sensible lighting concept which is beneficial to well-being in both summer and winter.

Further advantageous embodiments of the communication network, the method and the application for the mobile terminal also result from the remaining dependent sub-claims and are also made clear by the exemplary embodiment, which is described in more detail below with reference to the figures.

BRIEF DESCRIPTION OF THE DRAWING FIGURES

Figure 2:
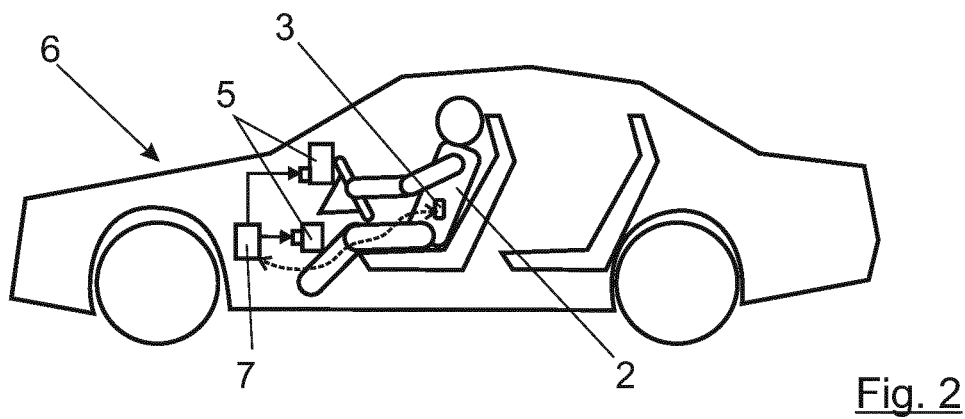
Figure 3:
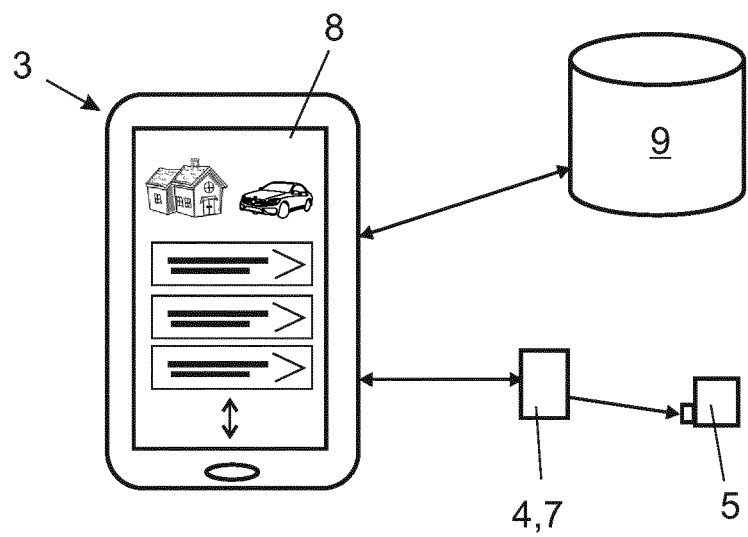

Here are shown:
FIG. 1 a first scenario to explain the invention in a house;
FIG. 2 a second scenario to explain the invention in a vehicle; and
FIG. 3 an exemplary depiction of the communication network according to the invention and exemplary functions of the application.

DETAILED DESCRIPTION

In the depiction of FIG. 1, a house 1 is symbolically indicated, which can be the home of a user designated as 2 or also his/her workplace, for example. The user designated as 2 has a mobile terminal 3, for example a smartphone, with him/her, which forms a communication network with a gateway 4, which in turn comprises individual networked lighting systems 5 in the house 1. By way of example, the two lighting systems 5 mentioned above should be corresponding light means, in particular controllable room lighting via LED lighting means or similar. In the depiction in FIG. 1, the lower of the lighting systems 5, which is depicted to be correspondingly larger, is intended to depict, for example, a display element, in particular a display element of a computer or similar. The lighting system is defined by the display element itself, and in particular by its backlighting. The lighting systems 5 can be controlled via the gateway 4 and correspondingly networked with it via the mobile terminal 3, at least with regard to the color temperature, the light color, the brightness or light intensity or also the quantities of light emitted by the individual lighting systems 5. As soon as the user 2 with his/her mobile terminal 3 is near the gateway 4, the communication network is established, for example using methods suitable for near-field communication such as Bluetooth, NFC, wireless network or similar. At this moment, the mobile terminal 3 or an application running on it takes over the control of the lighting systems in the house 1, for example to provide a high light intensity and a cold light color, based on a so-called cold white, in the morning in order to support the waking and attention of the user 2. The scenario does not have to be exclusively at home in the house 1, but can also be in an office of the user 2 or another workplace for the user 2, provided that the appropriate lighting systems 5 are available or necessary there, in particular light, work light and display elements in the form of machine or computer displays.

If the user 2 now leaves the house, for example to drive to work, he/she will often use his/her vehicle, designated as 6, as depicted in FIG. 2. The user 2, in turn, is in vehicle 6 with his/her mobile terminal 3. A gateway 7 is also available in the vehicle 6, which establishes a corresponding communication with the mobile terminal 3 to form a part of the communication network. Here too, this gateway 7 is again connected to different lighting systems 5, for example display elements in the cockpit of the vehicle 6, an ambient lighting for the interior of the vehicle 6 and vehicle interior lighting (e.g. interior light, make-up lights, grab handle lights . . . ). The control with regard to the light color, light temperature, light intensity and similar can thus be "taken along" directly into the vehicle 6, such that a consistent lighting concept is still available even on the journey to work. At the workplace, which is in turn symbolized by the house 1 in FIG. 1, this lighting concept, for example a high light intensity with cold white light, remains. In the course of the day, depending on the expected end of working hours, the light then becomes increasingly warmer, such that ultimately the light changes from a cool white to a warm white, in order to provide the user 2 with a more pleasant and calming lighting ambience. This is correspondingly retained when he/she gets into his/her vehicle 6 with his/her mobile terminal 3, which controls this light profile, and drives home, where this lighting concept also prevails.

The lighting concept corresponding to the method can be used correspondingly for both the house 1 and the vehicle 6. Of course, it would also be conceivable to implement the lighting concept exclusively in the vehicle 6 and not in the house 1 as the home and/or workplace of the user 2 or vice versa. However, it would also be particularly advantageous to implement the lighting concept both in the home and in the vehicle 6 as well as the workplace, in order to be able to implement a lighting concept which is optimally adapted to the circadian rhythm throughout the course of the day.

In such a communication network, it would be fundamentally conceivable to control a continuous lighting concept, for example via time profiles or similar, largely freely via an application for the mobile terminal 3. In practice, however, this would involve a correspondingly high effort. It is therefore much easier and more convenient to set the corresponding lighting settings once for the screen 8 of the mobile terminal 3, for example of a smartphone of the user 2, or to adopt corresponding settings from the smartphone manufacturer's systems, for example the lighting adjustment that can be set under the term "night shift" for devices with iOS operating systems. Such a lighting setting on the screen 8 of the mobile terminal 3 can then be read by the application and used to control the lighting system in the house 1 and/or the vehicle 6. Time profiles affecting the lighting settings of the screen 8 of the mobile terminal 3 thus also affect the lighting systems 5. The user interface of such an application is shown as an example in the depiction in FIG. 3. The user 2 can choose to select the settings for the house or the vehicle and can then choose from various settings which comprise at least the color temperature of the light or, in the case of display elements and the screen 8, of its backlighting. Further aspects are, for example, the light intensity or light quantity/brightness, the color of the light as such and other settings. These settings can be used directly for controlling the lighting systems 5 or can be further parameterized, for example to individually implement adapted settings at specific locations and/or specific lighting systems 5 within the house 1 and/or the vehicle 6.

The mobile terminal 3 thus forms a part of the communication network together with the gateways 4, 7 and lighting systems 5 networked with them. Moreover, in an advantageous design, a database 9, for example in a Cloud or on a backend of the vehicle manufacturer, can also be part of the communication network. In particular, all types of controllable elements of the lighting systems 5 in the house 1 and in the vehicle 6 can be stored in this database 9, as well as the necessary control parameters in order to be able to efficiently implement the user specifications from the application on the mobile terminal 3 in the lighting systems 5. In order not to have to constantly establish a mobile radio connection between the mobile terminal 3 and the database 9, it is also conceivable that the database 9 on the mobile terminal 3 itself is stored as an offline database, such that the functionality is also available without a mobile radio connection, since the lighting systems 5 are controlled via the application on the mobile terminal 3 via short-range communication.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A communication network for networking home or office lighting systems, the communication network comprising:
   an application on a mobile terminal, wherein the application is configured to control home or office lighting systems in surroundings of the mobile terminal based on lighting settings of a screen of the mobile terminal;
   further lighting systems in an interior of a vehicle, wherein the application is configured to control the home or office lighting systems or the further lighting systems depending on the lighting settings of the screen of the mobile terminal, wherein the lighting settings of the screen of the mobile terminal include color temperature of light emitted by the screen of the mobile terminal, backlighting emitted by the screen of the mobile terminal, intensity/quantity of the light emitted by the screen of the mobile terminal, or brightness of the light emitted by the screen of the mobile terminal;
   a database, which stores all controllable elements of the home or office lighting system and the further lighting systems, as well as control parameters to implement settings of the application.

2. The communication network of claim 1, wherein the home or office lighting system or the further lighting systems comprise backlighting and display elements, wherein the application is configured to control a color temperature of the backlighting.

3. The communication network of claim 1, wherein the further lighting systems comprise an ambient interior lighting, interior lights, or background lighting in the vehicle.

4. The communication network of claim 1, wherein the database is an online database or an offline database on the mobile terminal.

5. The communication network of claim 1, wherein the light settings for the screen of the mobile terminal are user- or manufacturer-selected settings for lighting of the screen of the mobile terminal.

6. The communication network of claim 1, wherein the database is a database on the mobile terminal.

7. A method for controlling lighting systems via an application on a mobile terminal with a screen, the method comprising:
    determining light settings of the screen of the mobile terminal, wherein the determined light settings are user- or manufacturer-selected settings for lighting of the screen of the mobile terminal, and wherein the lighting settings of the screen of the mobile terminal include color temperature of light emitted by the screen of the mobile terminal, backlighting emitted by the screen of the mobile terminal, intensity/quantity of the light emitted by the screen of the mobile terminal, or brightness of the light emitted by the screen of the mobile terminal;
    storing, in a database, all controllable elements of the lighting systems and control parameters to control the lighting systems based the determined light settings of the screen of the mobile terminal;
    determining that the mobile terminal is in a vicinity of the lighting systems;
    forming, by the mobile terminal responsive to the determination that the mobile terminal is in the vicinity of the lighting systems, a communication network with the lighting systems;
    transferring, by the mobile terminal responsive to the formation of the communication network, lighting settings for the lighting systems; and
    controlling the lighting systems based on the determined light settings of the screen of the mobile terminal and the lighting settings for the lighting systems.

8. The method of claim 7, wherein
    the lighting systems comprise backlighting and display elements of house and home technology, office technology and an ambient interior lighting in a vehicle, and/or lighting of backlighting of display elements in a vehicle.

9. The method of claim 7, wherein the user- or manufacturer-selected settings are set by:
    setting, on the mobile terminal, a time-dependent profile for the lighting settings of the screen; and
    transmitting, by the mobile terminal to the lighting systems, the time-dependent profile immediately or after parameterization by a user.

10. The method of claim 7, wherein the database is a database on the mobile terminal.

11. An application for a mobile terminal for controlling lighting systems in a communication network, the application being configured to:
    determine light settings of the screen of the mobile terminal, wherein the determined light settings are user- or manufacturer-selected settings for lighting of the screen of the mobile terminal, and wherein the lighting settings of the screen of the mobile terminal include color temperature of light emitted by the screen of the mobile terminal, backlighting emitted by the screen of the mobile terminal, intensity/quantity of the light emitted by the screen of the mobile terminal, or brightness of the light emitted by the screen of the mobile terminal;
    store, in a database, all controllable elements of the lighting systems and control parameters to control the lighting systems based the determined light settings of the screen of the mobile terminal;
    determine that the mobile terminal is in a vicinity of the lighting systems;
    form, responsive to the determination that the mobile terminal is in the vicinity of the lighting systems, the communication network with the lighting systems; and
    transferring, responsive to the formation of the communication network, the control parameters to the lighting systems, wherein the lighting systems are home lighting systems, office lighting systems, or vehicle lighting systems.

12. The application of claim 11, wherein the user- or manufacturer-selected settings for the lighting of the screen of the mobile terminal are configurable via adjustable parameters and/or parameters determined by sensors of the mobile terminal to control the lighting systems.

13. The application of claim 12, wherein time-dependent, brightness-dependent and/or location-dependent profiles can be set for automatic changes to the lighting settings of the screen of the mobile terminal and/or the adjustable parameters.

14. The application of claim 11, wherein the application is a partial functionality of a superordinate basic application, which is a vehicle-related basic application.

15. The application of claim 11, wherein the database is a database on the mobile terminal.

* * * * *